US012400782B2

(12) United States Patent
Khan et al.

(10) Patent No.: US 12,400,782 B2
(45) Date of Patent: Aug. 26, 2025

(54) STRUCTURAL ARRANGEMENT FOR ATTACHMENT OF A STANDOFF INSULATOR TO AN AIR CORE REACTOR

(71) Applicant: HSP Hochspannungsgeräte GmbH, Troisdorf (DE)

(72) Inventors: Kamran Khan, Toronto (CA); Andrew Lang, Toronto (CA)

(73) Assignee: HSP Hochspannungsgeräte GmbH, Troisdorf (DE)

( * ) Notice: Subject to any disclaimer, the term of this patent is extended or adjusted under 35 U.S.C. 154(b) by 807 days.

(21) Appl. No.: 17/718,363

(22) Filed: Apr. 12, 2022

(65) Prior Publication Data

US 2023/0326659 A1 Oct. 12, 2023

(51) Int. Cl.
*H01F 27/06* (2006.01)
*H01F 27/02* (2006.01)
*H01F 27/28* (2006.01)

(52) U.S. Cl.
CPC ............ *H01F 27/28* (2013.01); *H01F 27/02* (2013.01); *H01F 27/06* (2013.01)

(58) Field of Classification Search
CPC ......... H01F 27/28; H01F 27/06; H01F 27/306
See application file for complete search history.

(56) References Cited

U.S. PATENT DOCUMENTS

| | | | | |
|---|---|---|---|---|
| 5,202,584 | A * | 4/1993 | Burke | H01F 27/085 333/175 |
| 9,601,254 | B2 * | 3/2017 | Sharp | H01F 27/08 |
| 2019/0006091 | A1 * | 1/2019 | Salubro | H01F 27/33 |
| 2020/0194172 | A1 * | 6/2020 | Cremasco | H01F 41/005 |
| 2020/0335268 | A1 * | 10/2020 | Gholami | G10K 11/002 |

* cited by examiner

*Primary Examiner* — Sherman Ng
(74) *Attorney, Agent, or Firm* — David R. Stevens; Stevens Law Group

(57) ABSTRACT

An air core reactor including an improved structural arrangement for attaching cylindrical winding packages in the air core reactor is provided. Disclosed embodiments make use of spacer assemblies appropriately arranged to counterbalance bending moments that can develop during operation of the air core reactor and therefore improve the structural capability of the mechanical connection for the winding packages between respective spacers and spider units of the air core reactor.

18 Claims, 4 Drawing Sheets

STRUCTURAL ARRANGEMENT FOR ATTACHMENT OF A STANDOFF INSULATOR TO AN AIR CORE REACTOR

BACKGROUND

Disclosed embodiments relate generally to the field of electrical apparatuses, and, more particularly, to air core reactors.

BRIEF SUMMARY

A disclosed embodiment is directed to an air core reactor including a first cylindrical winding package positioned to extend along a central axis from a first reactor end to a second reactor end, a second cylindrical winding package positioned radially inward of the first cylindrical winding package and positioned to extend along the central axis from the first reactor end to the second reactor end, a spider arm that extends in a direction away from the central axis along a radius to a spider end and is coupled to the first cylindrical winding package and the second cylindrical winding package, a first attachment bracket includes a first inner flange, a first outer flange, and a first web connecting the first inner flange to the first outer flange, the first inner flange coupled to the spider end, a first spacer positioned between the first cylindrical winding package and the second cylindrical winding package, the first spacer having a first spacer end coupled to the first outer flange of the first attachment bracket, and a first collar disposed around the first spacer end of the first spacer between the first attachment bracket and the first cylindrical winding package and the second cylindrical winding package.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

1.

DETAILED DESCRIPTION

Figure 1:
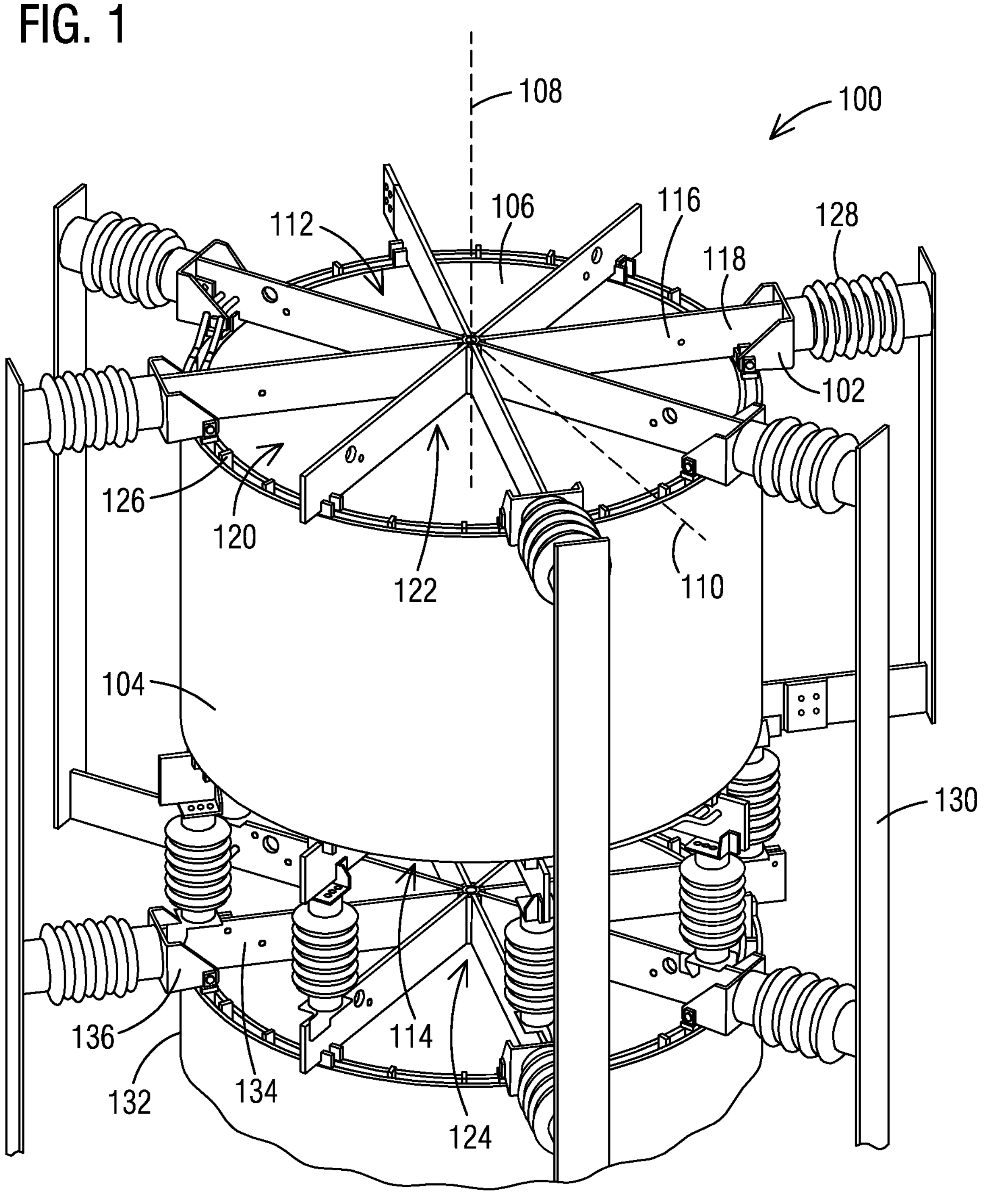
FIG. 1 is a view of an electrical apparatus, such as a dry-type air core reactor, that can benefit from disclosed structural arrangements for attaching conductor winding packages in the air core reactor.

FIG. 1 is a view of an electrical apparatus, such as an air core reactor 100, that can benefit from disclosed embodiments described in greater detail below. Disclosed embodiments involve an improved structural arrangement for attaching cylindrical winding packages in the air core reactor 100. The terms air core reactor, air core inductor and air core coil are often used interchangeably by those skilled in the art and refer to inductors that involve an air core in lieu of a magnetic core made of a ferromagnetic material. An inductor (reactor, or coil) is a passive electrical component that may be used to store energy available in an electromagnetic field when electric current flows through the inductor.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may.

It is noted that disclosed embodiments need not be construed as mutually exclusive embodiments, since aspects of such disclosed embodiments may be appropriately combined by one skilled in the art depending on the needs of a given application.

Air core reactor 100 includes one or more electrical devices, such as a plurality of radially-concentric, spaced-apart cylindrical winding packages 104, 106 positioned about a central axis 108 that extends from a first reactor end 112 to a second reactor end 114. The cylindrical winding packages 104, 106 may define a centrally-disposed hollow cavity 120. It will be appreciated that air core reactor designs may include fewer or substantially more winding packages than shown in FIG. 1 (e.g., ranging from one winding package to twenty or more winding packages). For simplicity of illustration, FIG. 1 illustrates just two winding packages labelled 104, 106.

Without limitation, cylindrical winding packages 104, 106 may be positioned between an upper spider unit 122 and a lower spider unit 124, which, in certain embodiments, may function as terminals for connecting power lines and/or for interconnecting the cylindrical windings in a desired electrical configuration, such as a parallel circuit arrangement. It will be appreciated that the winding packages of the reactor are rigidly held between upper spider unit 122 and lower spider unit 124 by appropriate means, such as, without limitation, non-conductive materials, which may include precured composite members or uncured composite members (that are hardened when the reactor is cured). The spider units 122, 124 may constitute structural members that facilitate lifting and/or fastening to the mounting system of a given reactor to other reactors, or both, or to a reactor foundation. Standoff insulator 128 may be attached to spider ends 118 and they may support current-carrying conductors 130. Cylindrical winding packages 104, 106 may be radially separated from one another by a plurality of circumferentially spaced-apart "duct sticks" or spacers 126, which may be positioned to have a vertical orientation extending in a direction parallel to central axis 108.

The present inventors have recognized that the structural strength of certain known mounting arrangements for the cylindrical winding packages in air core reactors 100 may be limited by the structural capability of a welded or bolted connection between the standoff insulator 128 and the spider units 122, 126. For example, mechanical loads can develop during operation of the air core reactor 100, such as those forces that may result for heating and/or electromagnetic effects on spider arms 116 in the magnetic field of the air core reactor 100. These loads can result in undesirable bending moments being formed and applied to the welded or bolted connection. These bending moments, if left unrestrained, as is generally the case in such known mounting arrangements, can potentially affect the reliability and durability of the welded connection between the spacers 126 and the spider units. The present invention innovatively increases the bending resistance over conventional connections, such as welded or bolted "T" brackets, by counteracting the bending moment with axial forces.

At least in view of the foregoing recognition, disclosed embodiments make use of spacers 126 appropriately arranged to counterbalance such moments and therefore improve the structural capability of the mechanical connection between the spacers 126 and the spider units. Disclosed embodiments are also believed effective in resisting shear loads that may develop during operation of the air core reactor 100. Without limitation, spacers 126 used in disclosed embodiments may be realized by way of appropriate adaptation of spacers 126, generally used to facilitate convection cooling in the air core reactor 100.

In the embodiment shown in FIG. 1, the air core reactor 100 includes a first cylindrical winding package 104 positioned to extend along a central axis 108 from a first reactor end 112 to a second reactor end 114. A second cylindrical winding package 106 is positioned radially inward of the first cylindrical winding package 104 and positioned to extend along the central axis 108 from the first reactor end 112 to the second reactor end 114. A spider arm 116 extends in a direction away from the central axis 108 along a radius 110 to a spider end 118 and is coupled to the first cylindrical winding package 104 and the second cylindrical winding package 106. Although in FIG. 1 the arms of spider units 124, 126 are illustrated as extending from central axis 108, it will be appreciated that in certain embodiments, the spider arms 116 may be truncated. That is, the spider arms 116 need not extend from central axis 108 but from a point located between central axis 108 and spider end 118.

Figure 2:
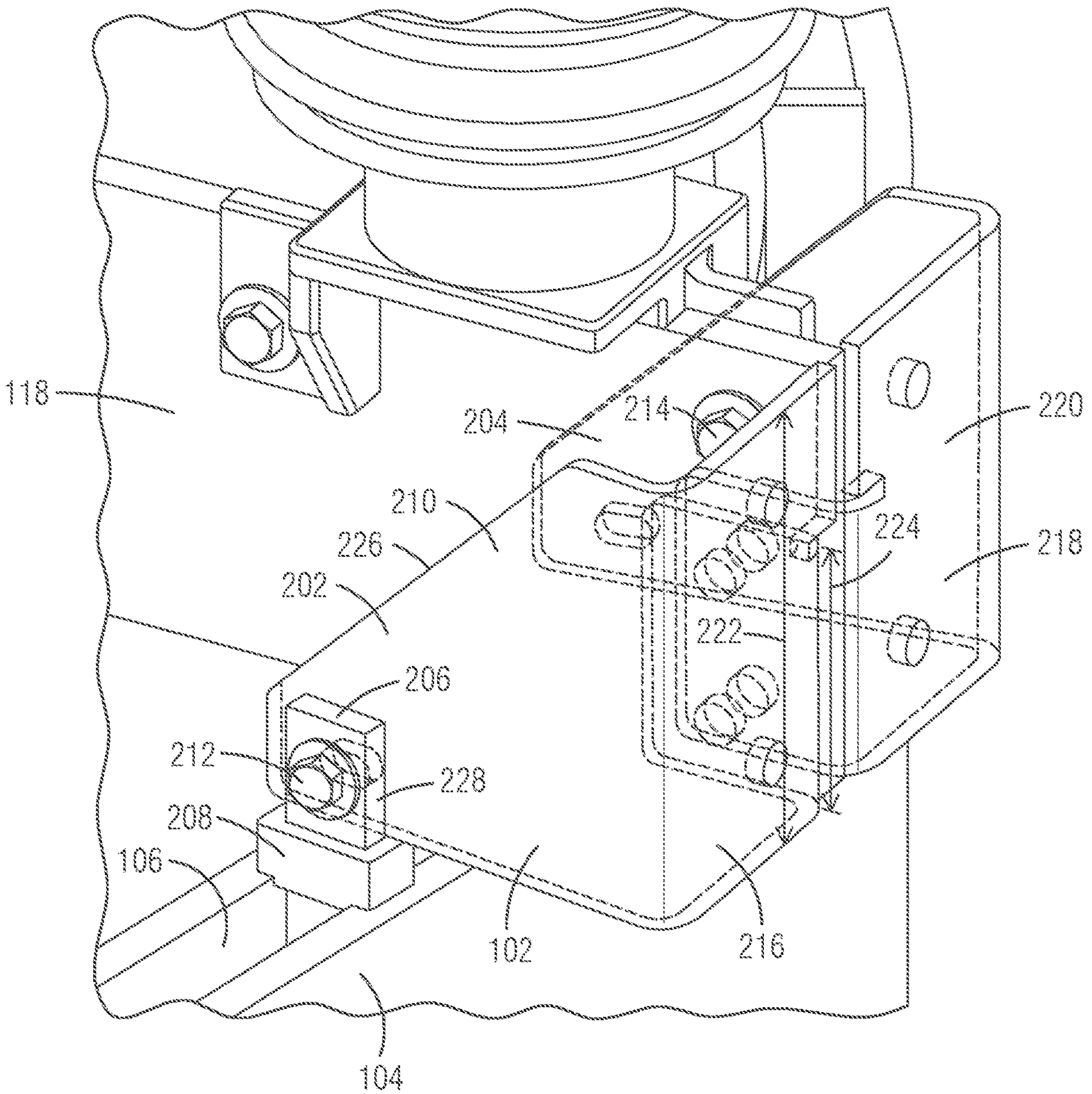
FIG. 2 illustrates an aspect of the subject matter in accordance with one embodiment.
Figure 3:
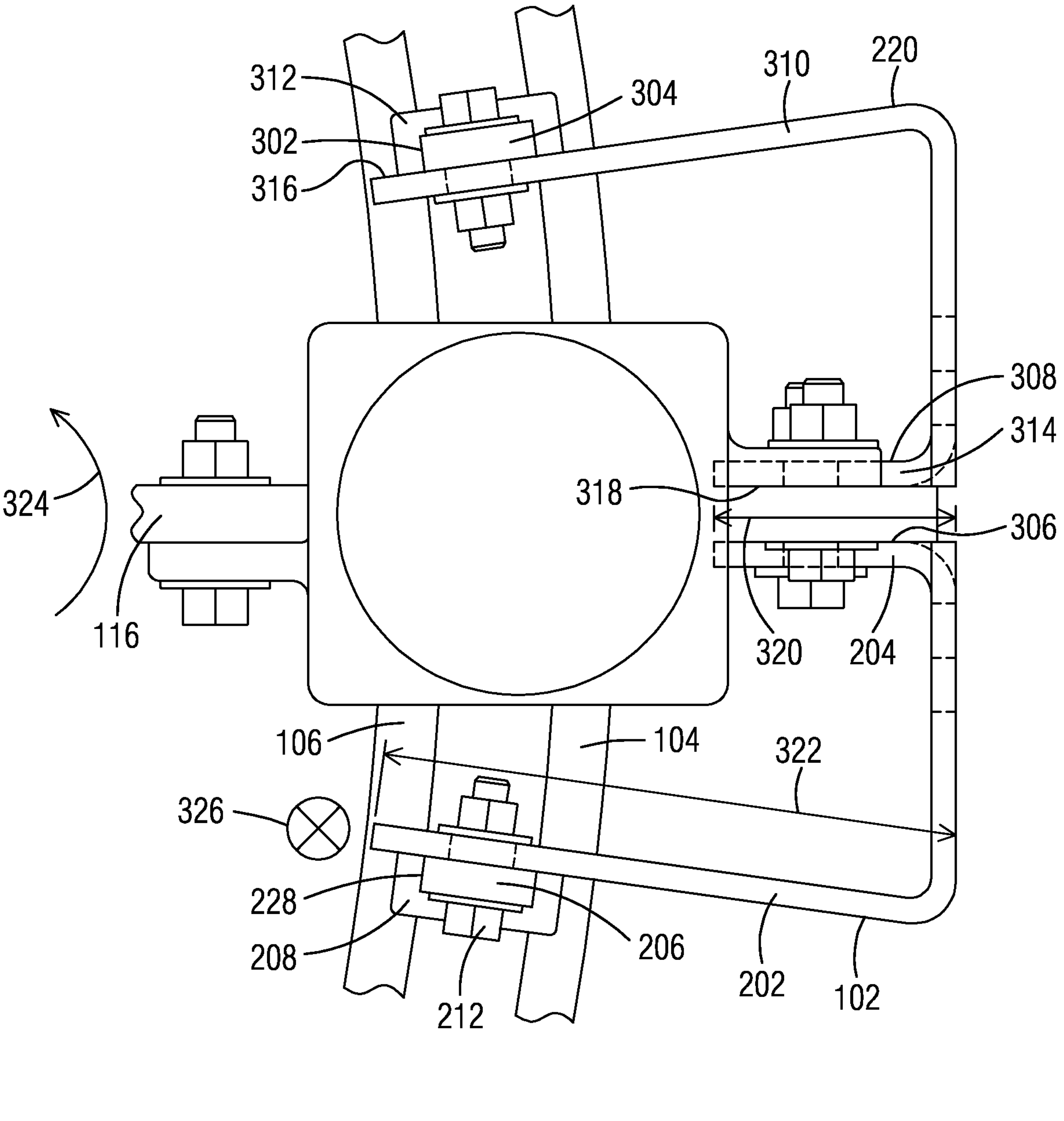
FIG. 3 illustrates an aspect of the subject matter in accordance with one embodiment.

FIG. 2 is an isometric, fragmentary view of a first attachment bracket 102 of the air core reactor 100. FIG. 3 shows a fragmentary top view first attachment bracket 102 of the air core reactor 100. In an embodiment, the first attachment bracket 102 may include a first inner flange 204, a first outer flange 202, and a first web 216 connecting the first inner flange 204 to the first outer flange 202. In an embodiment, the first inner flange 204 may be coupled to the spider end 118. The first spacer 228 may be positioned between the first cylindrical winding package 104 and the second cylindrical winding package 106, the first spacer 228 having a first spacer end 206 coupled to the first outer flange 202.

Without limitation, in the illustrated embodiment, the first attachment bracket 102 may be coupled to spider arm 116, which may be part of an upper spider unit 122 (FIG. 1). It will be appreciated that in certain applications, another attachment bracket 136 could be coupled to a second spider arm 134 of a second air core reactor 132 in a stacked embodiment, or any spider arm 116 of an air core reactor 100.

A first collar 208 may be disposed around the first spacer end 206 of the first outer flange 202 between the first attachment bracket 102 and the first cylindrical winding package 104 and the second cylindrical winding package 106. In one aspect, first collar 208 is formed from a non-conductive or dielectric material, that is, made of a material having electrical insulating properties.

Figure 4:
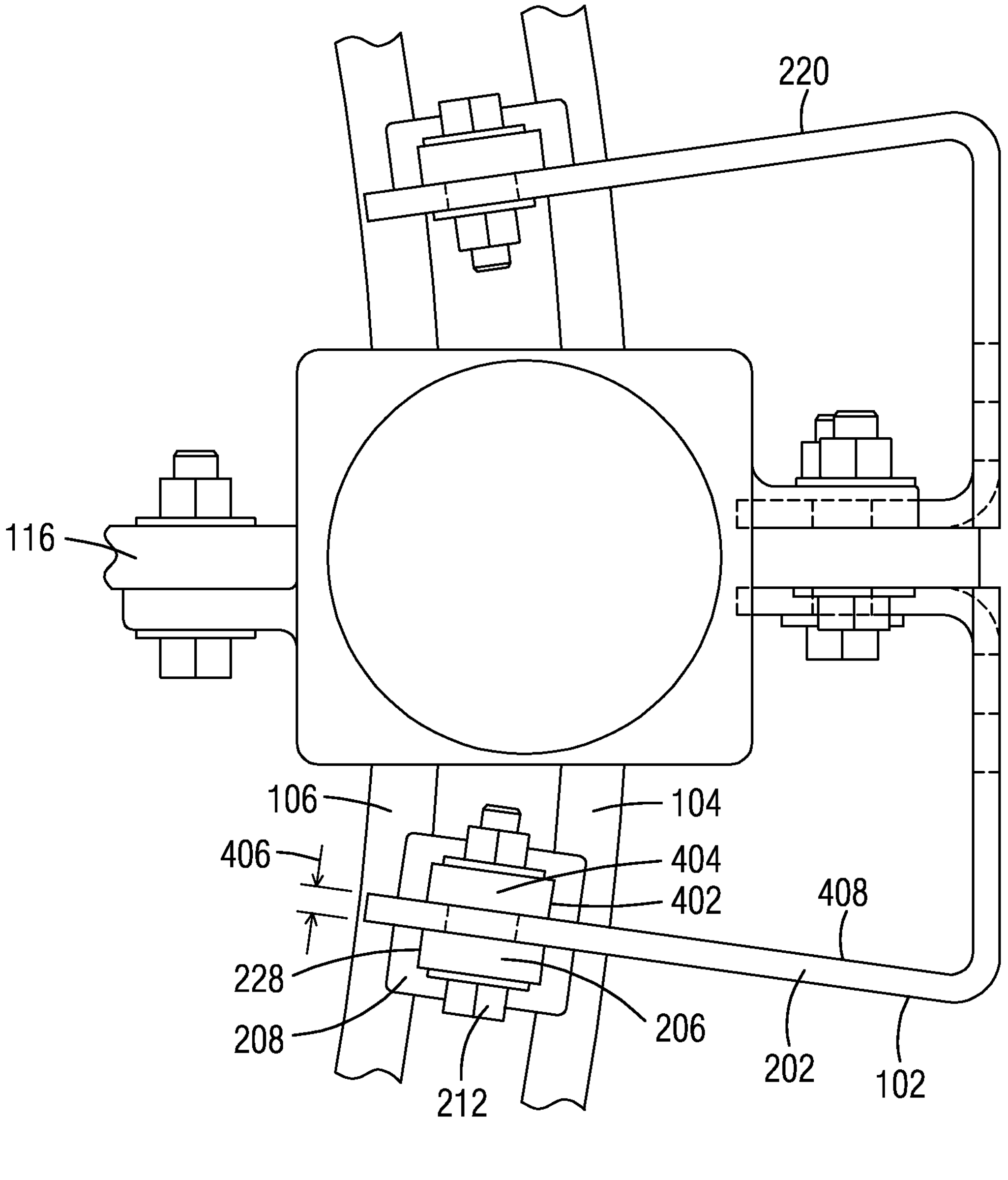
FIG. 4 illustrates an aspect of the subject matter in accordance with one embodiment.

In one non-limiting embodiment, the first outer flange 202 of the first attachment bracket 102 may include a first outermost surface 210 and the first inner flange 204 of the first attachment bracket 102 may include a first innermost surface 306. In one non-limiting embodiment, the first spacer end 206 is disposed against the first outermost surface 210. Alternatively, the first spacer end 206 may be disposed against a surface opposite the first outermost surface 210 of the first outer flange 202. In another embodiment depicted in FIG. 4, a third spacer 402 may positioned between the first cylindrical winding package 104 and the second cylindrical winding package 106 and spaced circumferentially apart from the first spacer 202 by at least second outer flange 310 width 406. The third spacer end 404 may be disposed against the inner surface 408. The second collar 312 may extend around both spacer ends 304, 206. The air core reactor 100 may also include a first outer bolt assembly 212, for example, comprising at least a nut and bolt, and may be used to affix the first outer flange 202 to the first outermost surface 210 of the first outer flange 202 of the first attachment bracket 102.

For the sake of simplicity of illustration, bolt assemblies are shown in connection with disclosed embodiments; it will be appreciated, however, that it is possible to use an alternative modality or combination of modalities to transfer compression and tensile loads, such as could include a geometric bearing feature (e.g., effective to transfer compression) and an adhesive (e.g., effective to transfer tension). For example, multiple separate bolt attachments may be used to affix the flanges 204 to the spacers 126 and/or spider ends 118. In an embodiment, the first outer flange 202 may be extended in the direction of the central axis 108 such that it permits the fastening of more than one bolt assembly (such as 212) thereto. In another embodiment, the first attachment bracket 102 may also include a first innermost surface 306 disposed against the spider end 118 and may include a first inner bolt assembly 214 to affix the first innermost surface 306 of the first inner flange 204 of the first attachment bracket 102 to the spider end 118.

In operation, when a bending moment 324 acts on the spider arm 116, the first attachment bracket 102 opposes the bending moment 324 via its first outer flange 202 coupling to the first outer flange 202. This arrangement provides an additional resistance force 326 force as opposed to being left unrestrained, as is the case in certain known arrangements.

In one non-limiting embodiment, the first outer flange 202 of the first attachment bracket 102 is longitudinally aligned along a radius 110 of the air core reactor 100. In another aspect, the first web 216 comprises a first web height 222 extending in a direction of the central axis 108.

In another aspect, the first inner flange 204 may include a first inner flange height 224 extending in a direction of the central axis 108, wherein the first inner flange height 224 may be less than the first web height 222. The first inner flange height 224 may be configured to accommodate a configuration of the spider end 118, such as for fastener clearance. In another non-limiting embodiment, the first outer flange may include an outer flange length 322 extending in a direction of the radius, and the first inner flange 204 comprises an inner flange length 320 extending in a direction of the radius 110, wherein the outer flange length 322 is greater than the inner flange length 320. The inner flange length 320 may be configured to accommodate a configuration of the spider end 118, such as for fastener clearance. In yet another aspect, the first outer flange 202 may include an angled edge portion 226 disposed away from the first web 216.

In another non-limiting embodiment, a third spacer 402, having a third spacer end 404, may be positioned between the first cylindrical winding package 104 and the second cylindrical winding package 106. The third spacer 402 may be spaced circumferentially apart from the first spacer 228 by at least a first outer flange 202 width 406. In an embodiment, the third spacer end 404 may be disposed against an inner surface 408 of the first outer flange 202.

The air core reactor 100 may also include a second attachment bracket 220 including a second inner flange 314, a second outer flange 310, and a second web 218 connecting the second inner flange 314 to the second outer flange 310. In an aspect, the second inner flange 314 may include a second innermost surface 318, the second innermost surface 318 coupled to the spider end 118 on a spider end 118 side 308 opposite the first attachment bracket 102, a second spacer 302 positioned between the first cylindrical winding package 104 and the second cylindrical winding package 106 and circumferentially spaced apart from first outer flange 202, the second spacer 302 having a second spacer end 304 coupled to a second outermost surface 316 of a second outer flange 310 of the second attachment bracket 220, and a second collar 312 disposed around the second spacer end 304 of the second spacer 302 between the second attachment bracket 220 and the first cylindrical winding package 104 and the second cylindrical winding package 106. In another aspect, a second web 218 of the second attachment bracket 220 may be attached to the first web 216 along at least a portion of the first web height 222.

Therefore, disclosed embodiments are effective to counterbalance bending moments 324 and improve the structural capability of the mechanical connection between the spacer and the spider units. Other technical features may be readily apparent to one skilled in the art from the following figures, descriptions, and claims.

LISTING OF DRAWING ELEMENTS

100 air core reactor
102 first attachment bracket
104 first cylindrical winding package
106 second cylindrical winding package
108 central axis
110 radius
112 first reactor end
114 second reactor end
116 spider arm
118 spider end
120 hollow cavity
122 upper spider unit
124 lower spider unit
126 spacers
128 standoff insulator
130 conductor
132 second air core reactor
134 second spider arm
136 another attachment bracket
202 first outer flange
204 first inner flange
206 first spacer end
208 first collar
210 first outermost surface
212 first outer bolt assembly
214 first inner bolt assembly
216 first web
218 second web
220 second attachment bracket
222 first web height
224 first inner flange height
226 angled edge portion
228 first spacer
302 second spacer
304 second spacer end
306 first innermost surface
308 side
310 second outer flange
312 second collar
314 second inner flange
316 second outermost surface
318 second innermost surface
320 inner flange length
322 outer flange length
324 bending moment
326 resistance force
402 third spacer
404 third spacer end
406 width
408 inner surface While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. An air core reactor comprising:

a first cylindrical winding package positioned to extend along a central axis from a first reactor end to a second reactor end;

a second cylindrical winding package positioned radially inward of the first cylindrical winding package and positioned to extend along the central axis from the first reactor end to the second reactor end;

a spider arm that extends in a direction away from the central axis along a radius to a spider end and is coupled to the first cylindrical winding package and the second cylindrical winding package;

a first attachment bracket comprising a first inner flange, a first outer flange, and a first web connecting the first inner flange to the first outer flange, the first inner flange coupled to the spider end;

a first spacer positioned between the first cylindrical winding package and the second cylindrical winding package, the first spacer having a first spacer end coupled to the first outer flange of the first attachment bracket; and a first collar disposed around the first spacer end of the first spacer between the first attachment bracket and the first cylindrical winding package and the second cylindrical winding package.

2. The air core reactor of claim 1, wherein the first outer flange of the first attachment bracket includes a first outermost surface and the first inner flange of the first attachment bracket includes a first innermost surface.

3. The air core reactor of claim 2, wherein the first spacer end is disposed against the first outermost surface.

4. The air core reactor of claim 2, further comprising a first outer bolt assembly to affix the first spacer to the first outermost surface of the first outer flange of the first attachment bracket.

5. The air core reactor of claim 2, wherein the first innermost surface is disposed against the spider end.

6. The air core reactor of claim 5, further comprising a first inner bolt assembly to affix the first innermost surface of the first inner flange of the first attachment bracket to the spider end.

7. The air core reactor of claim 1, wherein a bending moment applied to the spider arm is opposed by the first attachment bracket via its first outer flange coupling to the first spacer.

8. The air core reactor of claim 1, wherein the first collar is an electrical insulator.

9. The air core reactor of claim 1, wherein the first outer flange of the first attachment bracket is longitudinally aligned along a radius of the air core reactor.

10. The air core reactor of claim 1, wherein the first web comprises a first web height extending in a direction of the central axis.

11. The air core reactor of claim 10, wherein the first inner flange comprises a first inner flange height extending in a direction of the central axis.

12. The air core reactor of claim 11, wherein the first inner flange height is less than the first web height.

13. The air core reactor of claim 1, wherein the first outer flange comprises an outer flange length extending in a direction of a radius of the air core reactor and the first inner flange comprises an inner flange length extending in a direction of the radius, wherein the outer flange length is greater than the inner flange length.

14. The air core reactor of claim 1, wherein the first outer flange comprises an angled edge portion disposed away from the first web.

15. The air core reactor of claim 1, further comprising a third spacer positioned between the first cylindrical winding package and the second cylindrical winding package, the third spacer spaced circumferentially apart from the first spacer by at least a first outer flange width and comprising a third spacer end.

16. The air core reactor of claim 15, wherein the third spacer end is disposed against an inner surface of the first outer flange.

17. The air core reactor of claim 1, further comprising:

a second attachment bracket comprising a second inner flange, a second outer flange, and a second web connecting the second inner flange to the second outer flange, the second inner flange having a second innermost surface, the second innermost surface coupled to the spider end on a spider end side opposite the first attachment bracket;

a second spacer positioned between the first cylindrical winding package and the second cylindrical winding package, the second spacer having a second spacer end coupled to a second outermost surface of a second outer flange of the second attachment bracket; and a second collar disposed around the second spacer end of the second spacer between the second attachment bracket and the first cylindrical winding package and the second cylindrical winding package.

18. The air core reactor of claim 10, wherein a second web of the second attachment bracket is attached to the first web along at least a portion of the first web height.

* * * * *